United States Patent [19]
Holm

[11] 3,758,924
[45] Sept. 18, 1973

[54] APPARATUS FOR SHEARING PATTERNS ON PILE FABRICS

[75] Inventor: William J. Holm, Springfield, Vt.

[73] Assignee: Riggs & Lombard, Inc., Lowell, Mass.

[22] Filed: Nov. 30, 1972

[21] Appl. No.: 310,849

Related U.S. Application Data

[63] Continuation-in-part of Ser. No. 204,601, Dec. 3, 1971, abandoned.

[52] U.S. Cl. .................................. 26/16, 192/104 F
[51] Int. Cl. ............................................. D06c 23/02
[58] Field of Search ........................... 26/15 R, 16; 192/104 F; 226/111

[56] References Cited
UNITED STATES PATENTS

| | | | |
|---|---|---|---|
| 1,139,609 | 5/1915 | Weaver | 26/15 R |
| 2,758,355 | 8/1956 | Kradoska | 26/16 |
| 2,977,660 | 4/1961 | Gebert et al. | 26/16 |
| 3,127,292 | 3/1964 | Early | 226/111 X |
| 3,437,188 | 4/1969 | Long | 192/104 F |

FOREIGN PATENTS OR APPLICATIONS

| | | | |
|---|---|---|---|
| 28,330 | 0/1911 | Great Britain | 26/16 |

Primary Examiner—Robert R. Mackey
Attorney—Gerald Altman et al.

[57] ABSTRACT

A continuous belt is formed with apertures in a selected pattern and guided into face to face engagement with a running cloth web. A shearing revolver, cooperating ledger knife and rest are located across the line of contact between the belt and the web to shear cloth fibers extending through the apertures of the belt and thereby produce an embossed pattern on the cloth. A control system is provided between the belt and the cloth drive to maintain synchronous movement between the belt and the cloth.

1 Claim, 3 Drawing Figures

PATENTED SEP 18 1973 3,758,924
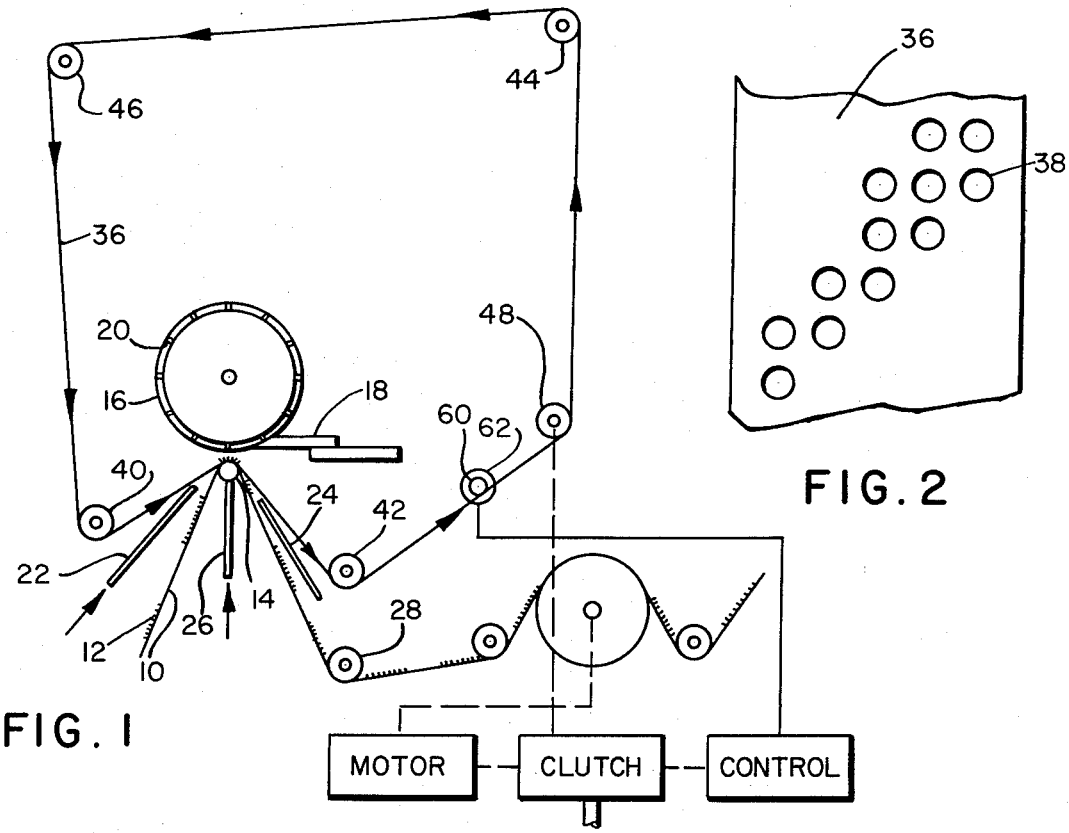
FIG. 1
FIG. 2
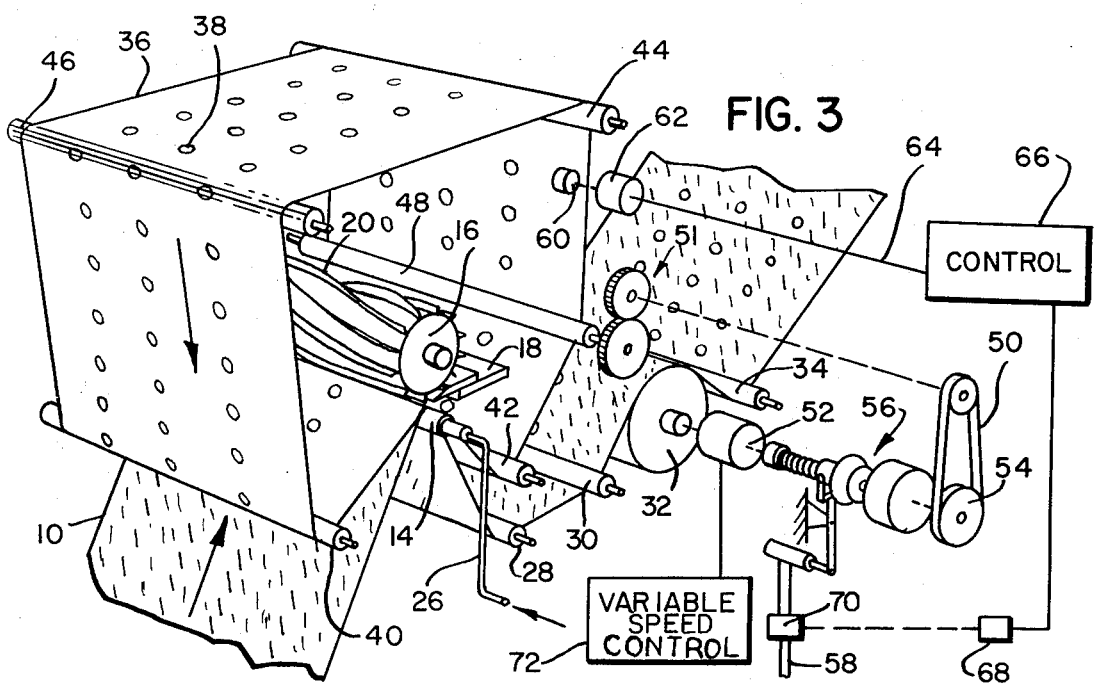
FIG. 3

APPARATUS FOR SHEARING PATTERNS ON PILE FABRICS

CROSS-REFERENCE TO RELATED APPLICATION

This is a continuation-in-part of U.S. Pat. application Ser. No. 204,601 filed Dec. 3, 1971 and now abandoned.

BACKGROUND OF THE INVENTION

1. Field of the Invention

This invention relates generally to cloth shearing machines and more particularly is directed towards a new and improved apparatus for shearing embossed patterns on a running cloth web.

2. Description of the Prior Art

In the production of various types of fabrics, particularly those fabrics with a high nap, it is often desirable to emboss a pattern over the face of the cloth. Various techniques have been employed heretofore to emboss fabrics of this type. One such technique is to coat the face of the fabric with a soluble cement which will mat down the nap over selected areas with the other portions of the nap remaining raised for cutting by a shearing machine. Thereafter the cement is washed out to allow it to return to its normal height. This technique is rather messy and expensive and requires a considerable amount of extra equipment. Furthermore, the technique does not produce a particularly sharp design. Other techniques have involved the use of embossed rollers wherein the cloth is pulled tightly against the roller and shearing equipment adjacent the roller trims off upstanding fibers. This technique does not make possible embossing of large patterns having widely spaced repeats but rather is limited to rather small designs with close repeats. Here again, the pattern produced is not particularly sharply defined.

Accordingly, it is an object of the present invention to provide an apparatus for shearing embossed patterns on a running web wherein large, widely spaced patterns may be embossed on the web in sharp definition.

SUMMARY OF THE INVENTION

This invention features an apparatus for shearing embossed patterns on a running fabric web comprising a shearing revolver and a cooperating ledger knife with a rest positioned in operative relation to the revolver and knife. A continuous, open-width belt is formed with a plurality of apertures in a desired design and is guided between the shearing elements and a running fabric web passing over the rest whereby fibers exposed through the apertures are selectively shorn to produce the desired embossed pattern on the fabric. The belt and fabric are driven by draft rolls with control means provided for synchronizing the speed of the belt and the fabric.

BRIEF DESCRIPTION OF THE DRAWINGS

FIG. 1 is a view in side elevation, somewhat schematic, of a pattern shearing apparatus made according to the invention, FIG. 2 is a fragmentary plan view showing a section of a patterned belt used in the FIG. 1 apparatus, and FIG. 3 is a somewhat schematic perspective of the FIG. 1 apparatus.

DETAILED DESCRIPTION OF THE PREFERRED EMBODIMENT

Referring now to the drawings, the reference character 10 generally indicates an open-width fabric web having a relatively high pile 12 such as a terry cloth material or the like. The web is guided over a rest 14 where the fibers are presented selectively for pattern shearing by a shearing revolver 16 and a cooperating fixed ledger knife 18. The revolver 16 preferably is of the air-draft type in which a suction is created within the center of the revolver to aid in drawing the fibers into an optimum shearing position. The revolver includes a plurality of helical cutting elements 20 spaced about the cylindrical outer surface for coaction with the ledger knife to trim the exposed upstanding fibers to a uniform height.

Positioned on either side of the rest 14 and above the web are fixed nozzles 22 and 24 connected to a source of compressed air and adapted to provide an air blast from either side of the rest towards the shearing line in order to aid in raising the fabric nap for shearing action. In the illustrated embodiment, the rest 14 is of the roller type and is also provided with a conduit 26 connected to a source of compressed air whereby air is delivered to the center of the roller 14 which is perforated to permit the compressed air to blow radially outward, again aiding in the erection of the fibers for trimming action along the shearing line.

From the shearing station, the web 10 is guided by break rolls 28 and 30 over a draft roll 32 and again about another break roll 34 which guides the sheared fabric to the next stage of production.

Operatively associated with the shearing apparatus is a continuous pattern belt 36 substantially the same width as the web 10 and formed with a plurality of apertures 38 therethrough in the desired pattern. The pattern may be circles, as suggested in FIG. 2, or may be any other design which is desired to be embossed on the web 10. The belt 36 should be of a non-stretching material and for this purpose nylon with a plastic finish or a flexible metal apron may be employed to advantage. The belt 36 is guided into superimposed relation over the web at the shearing line across the rest 14 by means of a group of break rolls 40, 42, 44 and 46 with a driven roll 48 drivingly connected to the draft roll 32 by means of a belt or chain 50 through a set of gears 51 to keep the drive action on both web and belt in the same direction. The driven roll 48 preferably is provided with a knurled cylindrical surface or may be covered with grip tape to insure a good driving, non-slip contact between the roller and the belt.

The break rolls 40 and 42 are disposed below the rest roller 14 and positioned to guide the belt 36 along a path which first converges with the web 10 up to the rest and then diverges therefrom as it leaves the rest whereby the belt will form a substantially 90° wrap about the rest roll 14 along the shearing line. It will be understood that when the belt passes into face to face engagement with the web 10, those fibers 12 which register with the belt openings 38 will project through the belt and will be shorn by the shearing revolver and ledger knife, while those portions of the fibers beneath the solid portions of the belt will be protected from shearing. As a result, the fibers 12 will be selectively shorn according to the pattern of the belt and by virtue of the belt apertures the embossing action will be sharply defined. The air jets provided by the nozzles 22 and 24, as well as the air passing through the rest roller 14 in cooperation with the air draft shearing revolver will insure that all of the fibers within the area defined by the apertures 38 will be raised upright to be trimmed off neatly and cleanly by the shearing elements.

In order to insure that the belt 36 moves at the same speed as the web 10 to prevent any relative slippage between the belt and the web, a synchronizing control system is provided. As shown in FIGS. 1 and 3, a motor 52 is drivingly connected both to a sprocket gear 54 through a clutch 56 which drives the driven roll 48 via the belt 50 and to the draft roll 32. In the preferred embodiment, the clutch 56 is air-operated and is connected to a source of compressed air through a conduit 58. Typically, an air-actuated clutch normally slips at the rate of about 10 percent when operating and, to insure a synchronous movement between the belt and the web, a belt speed monitoring device is provided, preferably in the form of a roller 60 riding against the belt 36 and operating a small generator 62. The output of the generator 62 is fed by a lead 64 to a control unit 66 which may include a solenoid 68 operatively connected to the clutch 56 by means of a solenoid actuated valve 70 which typically will control the amount of air fed into the clutch to control the speed of the roll 48. The control system thus serves to synchronize the speed of the belt and the web 10, and to compensate for speed differences that may develop when running cloths of various thicknesses and various stretch characteristics. The motor 52 preferably is of a variable speed type and is controlled as by a variable power supply 72.

Various types of clutches can be employed such as a double cone clutch, a friction disc clutch, an eddy current clutch, a pneumatic or by hydraulic clutch and the like.

Having thus described the invention what I claim and desire to obtain by Letters Patent of the United States is:

1. Apparatus for shearing patterns on a running fabric web, comprising
   a. a roller rest formed with radial openings and connected to a source of compressed air,
   b. an air draft shearing revolver and a ledger knife mounted in operative relation to said rest.
   c. first guide means for guiding said web over said rest in open width form,
   d. first drive means engaging said web for advancing said web over said rest,
   e. a continuous flexible belt formed with apertures therethrough and co-extensive in width with said web,
   f. second guide means for guiding said belt into face to face contact with said web over said rest between said web and said revolver,
   g. air jet means between said belt and said web on opposite sides of said rest for directing a flow of compressed air towards the shearing line between said rest and said revolver,
   h. second drive means engaging said belt for advancing said belt over said rest,
   i. clutch means operatively connected between said first and second drive means,
   j. one of said drive means being of variable speed,
   k. control means for synchronizing the speeds of said belt and web,
   l. said control means including sensing means responsive to the speed of said belt and connected to said clutch means,
   m. said sensing means including a roller engaging said belt, a generator driven by said roller, and solenoid actuating means connected to said clutch and responsive to said generator for synchronizing the speed of said belt and said web, and,
   n. a motor drivingly connected to said clutch and to the other of said drive means.

* * * * *